(12) United States Patent
Issari et al.

(10) Patent No.: US 12,269,093 B2
(45) Date of Patent: Apr. 8, 2025

(54) PRESSURIZED FLEXIBLE HOSE FOR DEMOLITION OF OBJECTS

(71) Applicant: Divergent Technologies, Inc., Los Angeles, CA (US)

(72) Inventors: Bahram Issari, Laguna Niguel, CA (US); Michael Thomas Kenworthy, Rancho Palos Verdes, CA (US); Taylor Caitlin Doty, Redondo Beach, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 18/159,646

(22) Filed: Jan. 25, 2023

(65) Prior Publication Data

US 2023/0241685 A1 Aug. 3, 2023

Related U.S. Application Data

(60) Provisional application No. 63/305,461, filed on Feb. 1, 2022.

(51) Int. Cl.
| | |
|---|---|
| *F16L 11/12* | (2006.01) |
| *B22F 12/00* | (2021.01) |
| *B33Y 40/00* | (2020.01) |
| *F16L 11/10* | (2006.01) |
| *B22F 10/28* | (2021.01) |

(52) U.S. Cl.
CPC ............ *B22F 12/00* (2021.01); *B33Y 40/00* (2014.12); *F16L 11/10* (2013.01); *F16L 11/12* (2013.01); *B22F 10/28* (2021.01)

(58) Field of Classification Search
CPC .......... B22F 12/00; B22F 10/28; B33Y 40/00; F16L 11/10; F16L 11/12
See application file for complete search history.

(56) References Cited

U.S. PATENT DOCUMENTS

| | | | | | |
|---|---|---|---|---|---|
| 2,670,762 | A | * | 3/1954 | Stivason | ................. E21B 21/00 285/239 |
| 2,700,622 | A | * | 1/1955 | Burwell | ................. B65D 85/84 427/403 |

(Continued)

OTHER PUBLICATIONS

International Search Report and Written Opinion in PCT/US23/61317, mailed Jun. 20, 2023, 14 pages.

*Primary Examiner* — David R Deal
(74) *Attorney, Agent, or Firm* — ARENTFOX SCHIFF LLP

(57) ABSTRACT

Apparatus and methods for removing and/or destroying support structures associated with objects fabricated using additive manufacturing techniques are presented herein. Structural supports may be used during an additive manufacturing process to prevent deformation of a build piece (e.g., three dimensional (3D) printed structure). In some examples, a build piece may be manufactured such that the structural supports are internal to the completed build piece. However, removing the structural supports may reduce the weight of the build piece and reduce the amount of debris trapped within the build piece. Thus, certain aspects of the disclosure are directed to a hose including a bendable and elongated tube member as well as a fracturing member configured to fracture an internal support structure within an additively manufactured part.

15 Claims, 12 Drawing Sheets

(56) References Cited

U.S. PATENT DOCUMENTS

| | | | | |
|---|---|---|---|---|
| 2,999,497 | A | * | 9/1961 | Hamilton ................. A62B 9/00 138/121 |
| 5,447,665 | A | * | 9/1995 | Steketee, Jr. ....... B29C 63/0013 264/36.17 |
| 10,571,642 | B1 | | 2/2020 | Cohen et al. |
| 2002/0007847 | A1 | * | 1/2002 | Abrams .............. F16L 55/1015 137/68.14 |
| 2018/0154580 | A1 | | 6/2018 | Mark |
| 2019/0039138 | A1 | | 2/2019 | Zafar et al. |
| 2021/0379827 | A1 | | 12/2021 | Stockett et al. |

\* cited by examiner

PRESSURIZED FLEXIBLE HOSE FOR DEMOLITION OF OBJECTS

CROSS-REFERENCE TO RELATED APPLICATIONS

This application claims priority to U.S. Provisional Application No. 63/305,461 titled "PRESSURIZED FLEXIBLE HOSE FOR DEMOLITION OF OBJECTS," filed Feb. 1, 2022, which is assigned to the assignee hereof, and incorporated herein by reference in its entirety as if fully set forth herein.

BACKGROUND

Field

The present disclosure relates generally to techniques for manufacturing structures via additive manufacturing techniques, and more specifically to removing temporary supports used for the manufacture of the structures.

Background

Three-dimensional (3D) printing, also referred to as additive manufacturing, has presented new opportunities to efficiently build components for automobiles and other transport structures such as airplanes, boats, motorcycles, and the like. Applying additive manufacturing processes to industries that produce these products has proven to produce a structurally more efficient transport structure. An automobile produced using 3D printed components may be made stronger, lighter, and consequently, more fuel efficient.

Support structures are commonly used in additive manufacturing to expand features available in a fabricated object, e.g., by providing underlying structural support for overhangs or lengthy bridges of otherwise unsupported material. In some scenarios, the support structures are temporary and may be removed after manufacture of the fabricated object is complete. However, the use of support structures in complex and/or relatively small objects may increase the difficulty of removing the support structure after manufacture. For example, support structures that are outside of the object are visible and may be readily removed via mechanical means, while internal support structures may be encased within the fabricated object, and may not be easily removed because of small openings, complex interior structures, etc.

SUMMARY

Several techniques for removing and/or destroying support structures associated with objects fabricated using additive manufacturing techniques will be described more fully hereinafter.

Certain aspects are directed to a hose including a bendable and elongated tube member configured to be inserted into a hollow portion of an additively manufactured part. In some examples, the tube member includes an internal channel with an inlet and an outlet, the internal channel configured for fluid flow from the inlet to the outlet, wherein the inlet is configured to receive the fluid flow from a pressurized source, and the outlet is configured to cause the tube member to flail upon egress of the fluid flow from the outlet. In some examples, the hose further includes a fracturing member, the fracturing member configured to fracture an internal support structure within the hollow portion of the additively manufactured part during the flailing of the tube member.

Certain aspects are directed to a hose including a bendable and elongated tube member configured to be inserted into a hollow portion of an additively manufactured part. In some examples, the tube member includes an internal channel with an inlet and an outlet, and the internal channel configured for fluid flow from the inlet to the outlet, wherein the inlet is configured to receive the fluid flow from a pressurized source, and the outlet is configured to cause the tube member to flail upon egress of the fluid flow from the outlet. In some examples, the hose includes a balloon secured to the outlet so than an inflatable interior is configured to receive a portion of the fluid flow from the pressurized source such that the portion of the fluid flow causes the balloon to inflate.

Certain aspects are directed to a method for removing support structure from an internal portion of an additively manufactured part. In some examples, the method includes inserting a tube member into the internal portion, the tube member comprising a fracturing member and an internal channel with having an inlet and an outlet, the internal channel configured for fluid flow from the inlet to the outlet. In some examples, the method includes applying a pressurized fluid to the inlet to cause the tube member to flail due to egress of the fluid flow from the outlet, whereby the flailing causes the fracturing member to fracture the support structure.

Certain aspects are directed to a method for removing support structure from an internal portion of an additively manufactured part. In some examples, the method includes inserting a tube member into the internal portion, the tube member comprising a balloon and an internal channel configured for flow of a pressurized fluid from an inlet of the internal channel to an outlet of the internal channel, wherein the balloon is secured to the outlet such that the balloon inflates upon receiving a portion of the pressurized fluid. In some examples, the method includes applying the pressurized fluid to the inlet to cause the balloon to inflate, whereby the inflation causes the balloon to fracture the support structure.

BRIEF DESCRIPTION OF THE DRAWINGS

Various techniques for removing and/or destroying support structures associated with objects fabricated using additive manufacturing techniques will now be presented in the detailed description by way of example, and not by way of limitation, in the accompanying drawings, wherein.

DETAILED DESCRIPTION

Figure 1A:
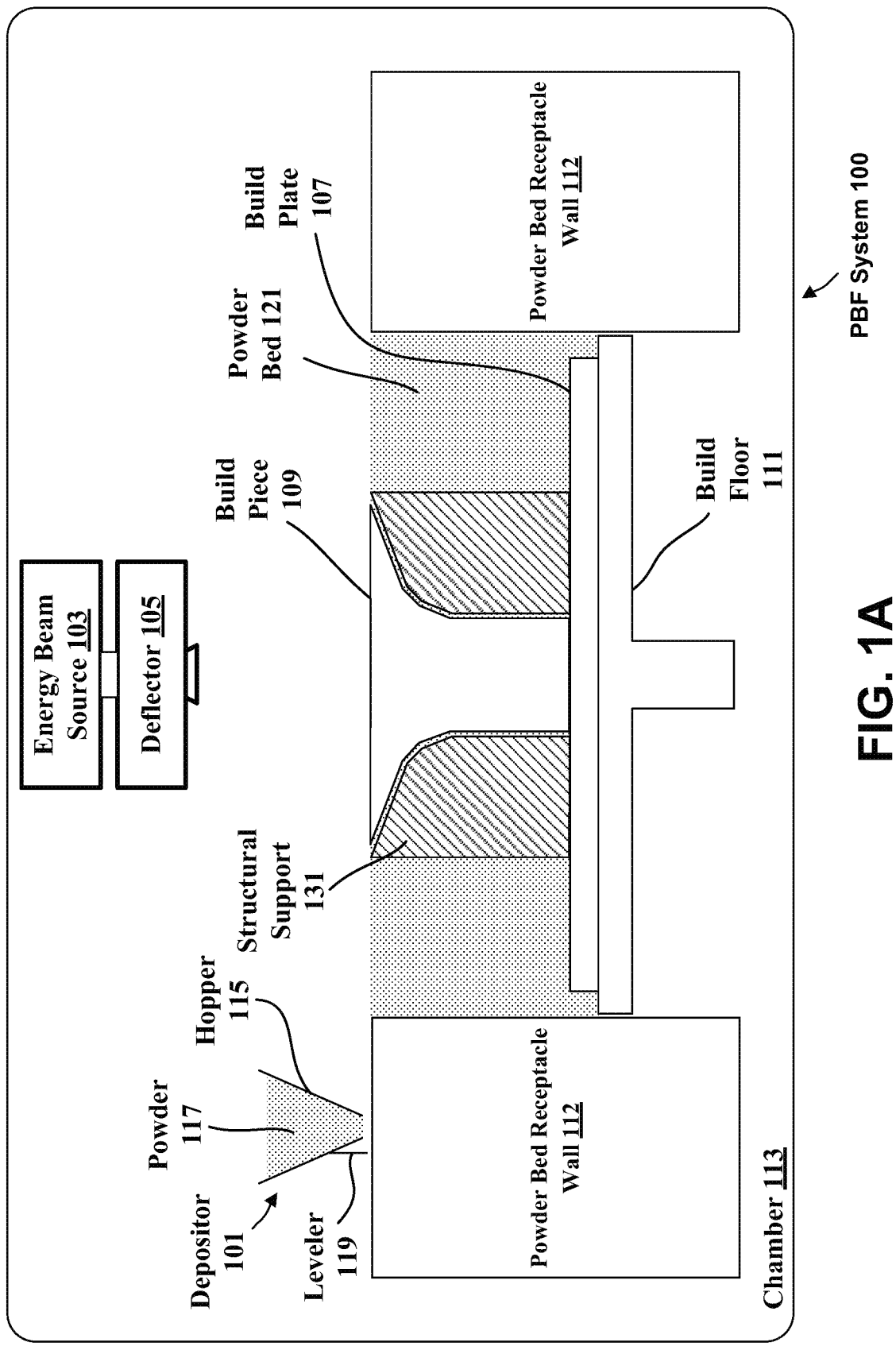
FIGS. 1A-D illustrate an example 3-D printer system during different stages of operation.

The detailed description set forth below in connection with the drawings is intended to provide a description of example embodiments of for removing and/or destroying support structures associated with objects fabricated using additive manufacturing techniques, and it is not intended to represent the only embodiments in which the invention may be practiced. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of 3-D printing provides significant flexibility for enabling manufacturers of mechanical structures and mechanized assemblies to manufacture complex parts. Support structures are used in certain additive fabrication processes to permit fabrication of a greater range of object geometries. In some scenarios, the support structures are temporary and may be removed after manufacture of the fabricated object is complete. However, the use of support structures in complex and/or relatively small objects may increase the difficulty of removing the support structure after manufacture. For example, support structures that are outside of the object are visible and may be readily removed via mechanical means, while internal support structures may be encased within the fabricated object, and may not be easily removed because of small openings, complex interior structures, etc.

In some examples, chemicals and solvents may be used to remove the internal support structures, but such chemicals are expensive and may only be used once. Thus, aspects of the disclosure are directed to re-usable hoses configured to be inserted into the fabricated object and aggressively whipped around to break any internal support structures so that they can be removed. Accordingly, the example hoses described herein are cost-effective in that they can be reused, and constructed of inexpensive materials. Disposal of the examples hoses is also a simple process relative to disposal of caustic chemicals.

FIGS. 1A-D are diagrams illustrating respective side views of an example additive manufacturing or 3-D printer system. In this example, the 3-D printer system is a powder-bed fusion (PBF) system 100. FIGS. 1A-D illustrate PBF system 100 during different stages of operation. The particular embodiment illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein. PBF system 100 may include a depositor 101 that may deposit each layer of metal powder, an energy beam source 103 that may generate an energy beam, a deflector 105 that may apply the energy beam to fuse the powder material, and a build plate 107 and a structural support 131 may support one or more build pieces, such as a build piece 109. PBF system 100 may also include a build floor 111 positioned within a powder bed receptacle. The walls of the powder bed receptacle 112 generally define the boundaries of the powder bed receptacle, which is sandwiched between the walls 112 from the side and abuts a portion of the build floor 111 below. Build floor 111 may progressively lower build plate 107 so that depositor 101 may deposit a next layer. The entire mechanism may reside in a chamber 113 that may enclose the other components, thereby protecting the equipment, enabling atmospheric and temperature regulation and mitigating contamination risks. Depositor 101 may include a hopper 115 that contains a powder 117, such as a metal powder, and a leveler 119 that may level the top of each layer of deposited powder.

Note that the build piece 109 is designed such that a width of the base is relatively narrow compared to the expanding width of the top of the build piece 109. It will be appreciated that in some instances, a combination of one of more of heat, weight, and material strength may cause substantial stresses and deformation of the top of the build piece 109. For example, the outer edges of the top of the build piece 109 may sag without proper support or curl upwards without proper heat dissipation. To mitigate this, the structural support 131 may be included in the build to help maintain the intended shape of the build piece 109 by providing physical support and/or heat dissipation for one or more regions of the build piece as it is produced. In one example, the structural support 131 may be fabricated independently of the build piece 109 and arranged on the build plate 107 or within a partially completed build piece 109 during/prior to the build.

In another example, the structural support 131 may be included in the design of the build piece 109 and fabricated simultaneously with the build piece 109. The structural support 131 may be designed to have thinner surfaces and/or smaller support pieces in order to ensure that the structural support 131 is more prone to breakage relative to the build piece 109.

Referring specifically to FIG. 1A, this figure illustrates PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
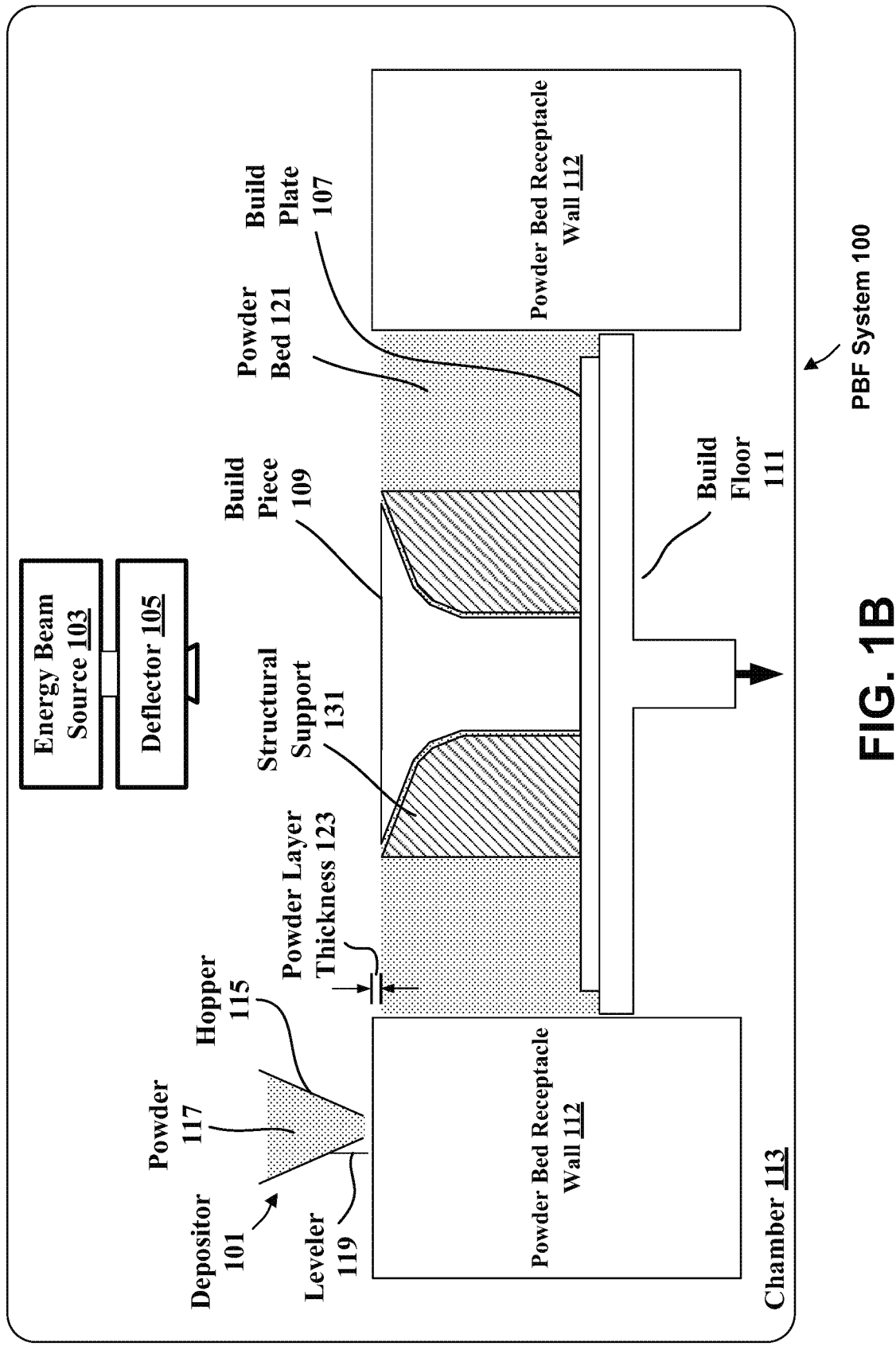

FIG. 1B illustrates PBF system 100 at a stage in which build floor 111 may lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 may be created over the top of build piece 109 and powder bed 121.

Figure 1C:
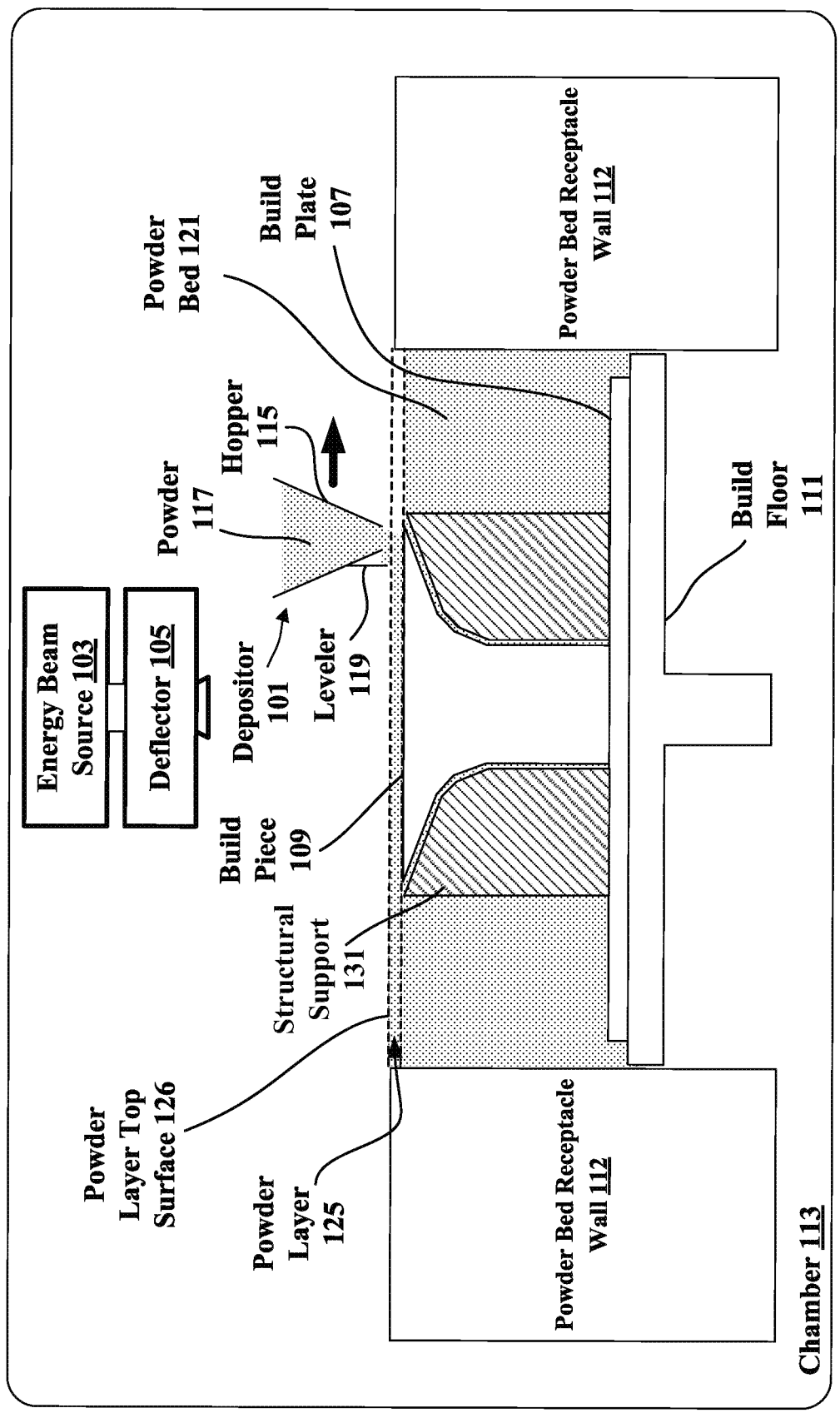

FIG. 1C illustrates PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 may level the released powder to form a powder layer 125 that has a thickness substantially equal to the powder layer thickness 123 (see FIG. 1B). Thus, the powder in a PBF system may be supported by a powder material support structure, which may include, for example, a build plate 107, structural support 131, a build floor 111, a build piece 109, walls 112, and the like. It should be noted that the illustrated thickness of powder layer 125 (e.g., powder layer thickness 123 (FIG. 1B)) is greater than an actual thickness used for the example involving 150 previously-deposited layers discussed above with reference to FIG. 1A.

Figure 1D:
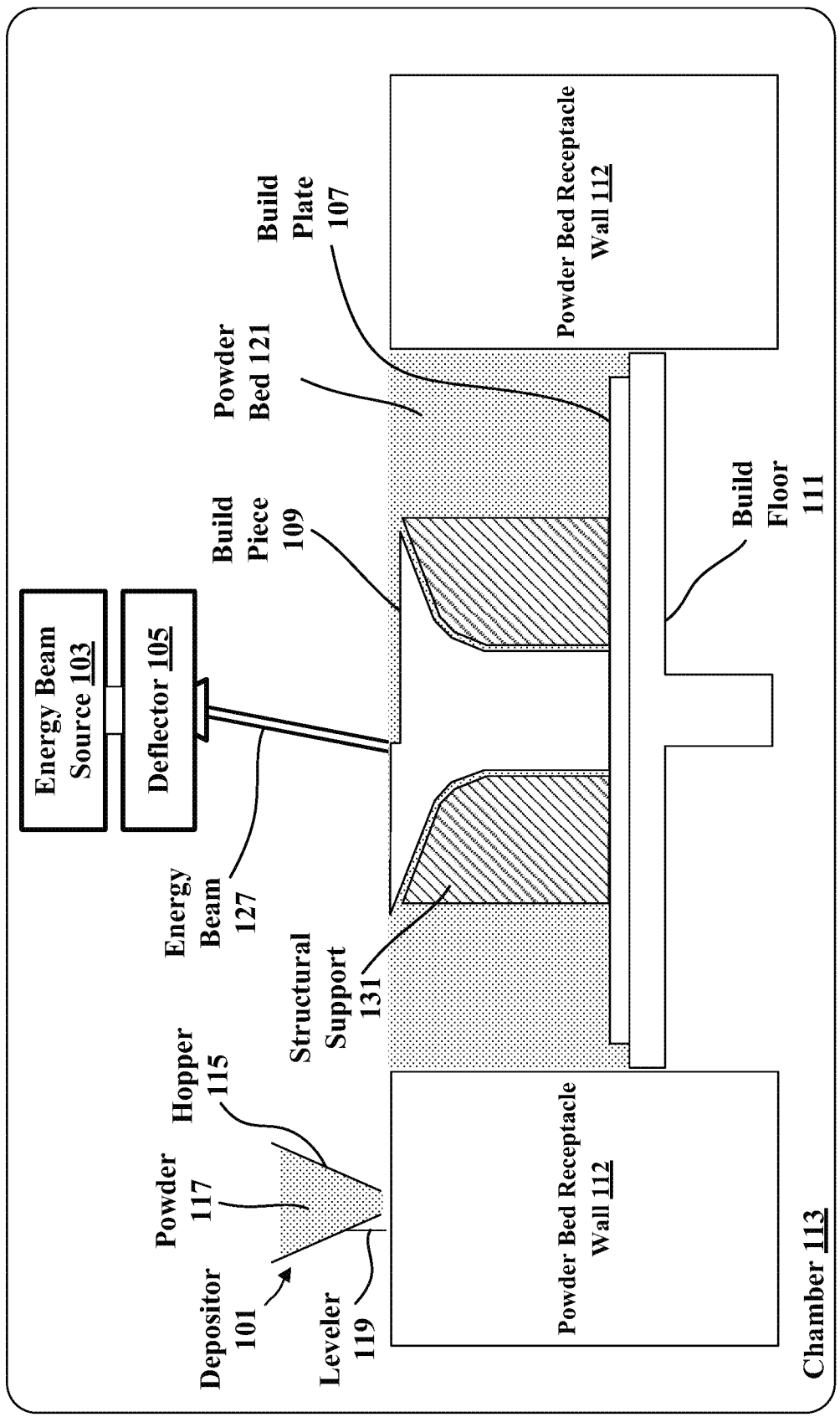

FIG. 1D illustrates PBF system 100 at a stage in which, following the deposition of powder layer 125 (FIG. 1C), energy beam source 103 generates an energy beam 127 and deflector 105 applies the energy beam to fuse the next slice in build piece 109. In various example embodiments, energy beam source 103 may be an electron beam source, in which case energy beam 127 constitutes an electron beam. Deflector 105 may include deflection plates that may generate an electric field or a magnetic field that selectively deflects the electron beam to cause the electron beam to scan across areas designated to be fused. In various embodiments, energy beam source 103 may be a laser, in which case energy beam 127 is a laser beam. Deflector 105 may include an optical system that uses reflection and/or refraction to manipulate the laser beam to scan selected areas to be fused.

In various embodiments, the deflector 105 may include one or more gimbals and actuators that may rotate and/or translate the energy beam source to position the energy beam. In various embodiments, energy beam source 103 and/or deflector 105 may modulate the energy beam, e.g., turn the energy beam on and off as the deflector scans so that the energy beam is applied only in the appropriate areas of the powder layer. For example, in various embodiments, the energy beam may be modulated by a digital signal processor (DSP).

Examples of Object Demolition Using a Flexible Hose

Figure 2:
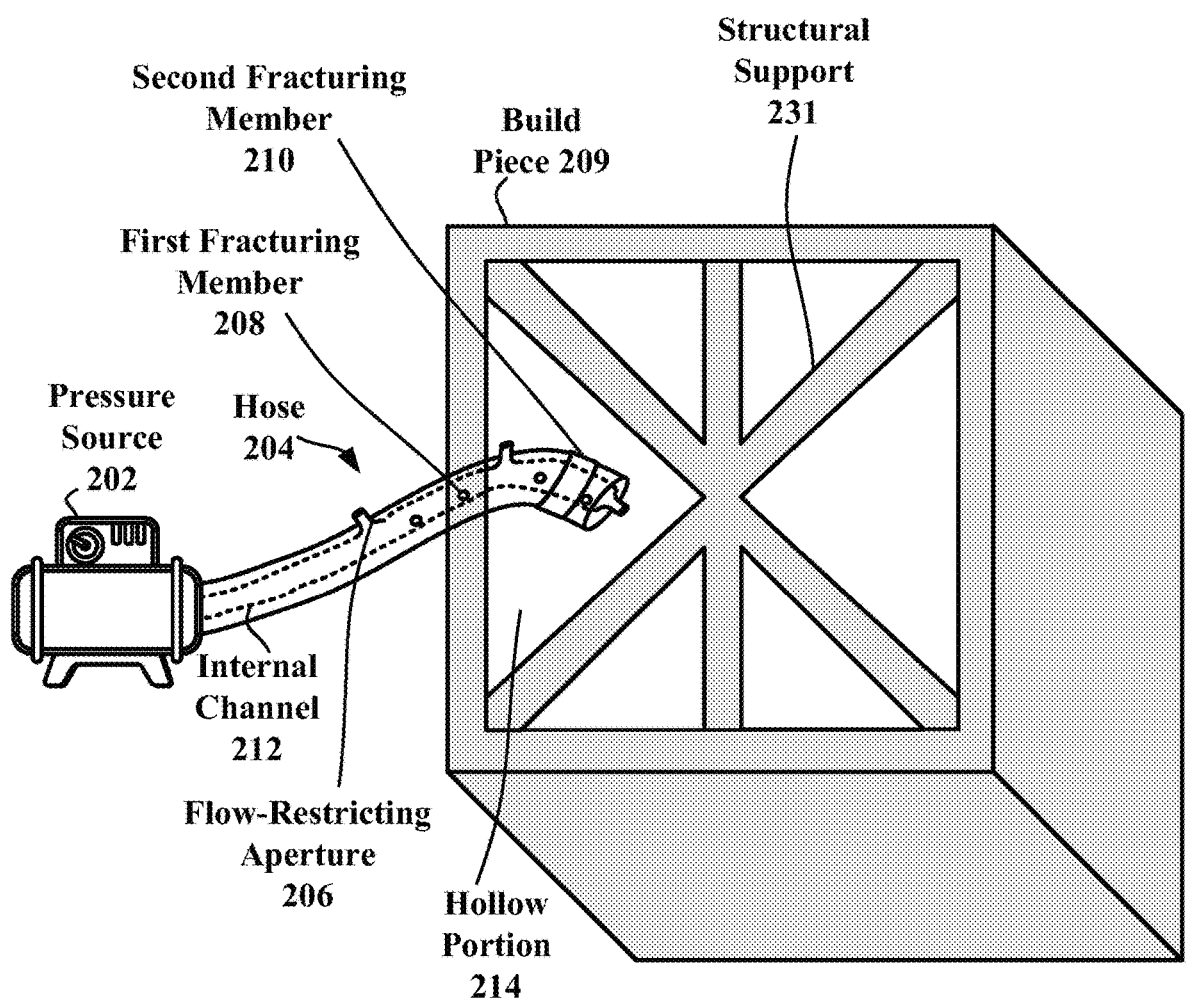
FIG. 2 is a diagram illustrating an example of a hose configured to demolish a structural support internal to a build piece.

FIG. 2 is a diagram illustrating an example of a hose 204 configured to demolish a structural support 231 internal to a build piece 209. The hose 204 includes a proximal end and a distal end, and an internal channel 212 configured to provide a fluid pathway between both ends. Here, the proximal end is configured to securely attach to an outlet of a pressure source 202, and the distal end of the hose 204 is inserted into the build piece 209 so that it is adjacent to the structural support 231. In basic dimensions, the hose 204 may extend axially to a predetermined length, wherein the internal channel has an inner diameter $D_i$ and an outer surface of the hose 204 has an outer diameter $D_o$. The dimensions of the inner diameter $D_i$ and the outer diameter $D_o$ can vary depending upon the particular fluid being conveyed and characteristics of the build piece 209 and structural support 231, as described in more detail below.

In one example, the pressure source 202 may be an air/liquid compressor. The pressure source 202 may provide a pressurized fluid to the internal channel 212 of the hose 204. The pressurized fluid may include one or more of a gas (e.g., ambient air collected by an air compressor), a liquid (e.g., water, chemical, or solvent), or a particulate matter (e.g., silica sand or any other suitable abrasive material or solid particulate matter).

The hose 204 may include one or more flow-restricting apertures 206 that allow the pressurized fluid to escape from the internal channel 212 to an environment outside of the hose 204. The apertures 206 may be configured to restrict egress of the fluid flow from the hose 204 such that the amount of pressurized fluid allowed to escape the internal channel 212 maintains adequate pressure within the hose 204. It will be appreciated that as the pressure within the hose 204 increases, so too will the speed of pressurized fluid escape from the apertures 206. Thus, the pressurized fluid escaping from the apertures 206 may cause the hose 204 to move about within the build piece 209. Likewise, the hose 204 may move more aggressively because its movement is directed by the increasing rate at which fluid escapes from the apertures 206 as the pressure increases within the hose 204.

The hose 204 may be designed as an elongated tube, with a size and length suitable for insertion into a hollow portion 214 of the build piece 209. In some examples, the hose 204 may be designed based on a particular build piece. For instance, the length of the hose 204 may be based on a distance from an opening in the particular build piece to a location of a structural support 231 inside of the build piece 209. As such, the length of the hose 204 is appropriate for demolition of one or more support structures in a particular build piece 209. The thickness of the hose 204 may also be based on the size of the opening and any internal channels of the build piece 209 and/or structural support 231 so that the hose is small enough to reach the structural support 231. The hose 204 may also be designed such that one or more regions of the hose 204 bend with a bias to aid a user in passing the hose 204 into the build piece 209 and directing the hose 204 to the structural support 231. The hose 204 may be constructed of any suitable material that provides flexibility and movement of the hose 204 while maintaining appropriate levels of pressure in the internal channel 212 without damaging the hose 204. For example, the hose may be constructed of one or more of nylon, polyurethane, polyethylene, polyvinyl chloride (PVC) (e.g., unplasticized PVC (uPVC)), or synthetic or natural rubbers.

The hose 204 may be designed and constructed to include one or more fracturing members (e.g., a first fracturing member 208 and a second fracturing member 210) constructed of one or more of a metal (e.g., iron, tungsten, steel, alloys, etc.), plastic material (e.g., a hardened plastic/polymer such as high-density polyethylene (HDPE)), ceramic material, etc. The first fracturing member 208 may be a localized element, defined by a spike or blunt protrusion extending outwardly from an outer/exterior surface of the hose 204. The first fracturing member 208 may be attached to the outer surface of the hose 204 by one or more of an adhesive or other mechanical fastener (e.g., threads, screw, rivet, prong, magnet, etc.). In some examples, the first fracturing member 208 may include a portion that extends through a body of the hose 204 and attaches to an anchor within the internal channel 212.

In some examples, a computer system may design the hose 204 based on build piece 209 information. For example, geometric dimensions of the build piece 209 and the structural support 231, and/or the material characteristics of the pressurized fluid to be used in the hose 204. The computer system may determine a shape, a length, a material, and a design of the hose 204, as well as a shape, a length, a material, and a design of the fracturing members based on the build piece information and the material characteristics of the pressurized fluid.

The second fracturing member 210 may include a plate or mesh shaped conformal to a contour of the outer surface of the hose 204. In some examples, the second fracturing member 210 may wrap around the circumference of the outer surface like a ring or in a helical form. In another example, the second fracturing member 210 may wrap only partially around the circumference of the outer surface. Similar to the first fracturing member 208, the second fracturing member 210 may be attached to the outer surface of the hose 204 by one or more of an adhesive or other mechanical fastener (e.g., threads, screw, rivet, prong, magnet, etc.).

The hose 204 material, the fracturing member material, and/or the particular fracturing member configuration may be determined based on the material and/or construction characteristics of the structural support 231. For example, if the structural support 231 is relatively thick and/or is of a high material density, then a harder material may be used for the fracturing member material. Similarly, a design of the hose 204 may include an arrangement of one or more first fracturing members 208 and/or one or more second fracturing members 210 on the hose 204 based on the size, material, and/or construction characteristics of the structural support 231. For example, the hose 204 may include an array of first fracturing members 208 closely located relative to at least one other first fracturing member 208, or a more dispersed pattern. Alternatively or in addition, a region of the hose 204 may include one or more first fracturing members 208 arranged in a line, along one side of the hose 204, or in random locations.

The hose 204 may also be designed and constructed to include one or more flow-restricting apertures 206. As illustrated, the hose 204 includes an aperture 206 at the distal end and along the hose body. Location of the apertures 206 may be changed based on the location of the structural support 231. For example, one or more apertures 206 may be placed along a particular side of the hose 204 in order to cause the hose 204 to move in a particular direction within the build piece 209. Other patterns or arrangements of aperture 206 locations and numerosity may be used depending on a desired amount of hose 204 movement and/or strength of the movement. Similarly, a diameter or size of each of the one or more apertures 206 may be adjusted.

In certain aspects, the proximal end of the hose 204 may include an inlet for receiving pressurized fluid into the internal channel 212, and one or more of the body of the hose 204 and/or the distal end of the hose 204 may include an outlet (e.g., one or more apertures 206). The inlet may include a coupler (e.g., quick-connect coupler) to secure the hose to the pressure source 202. It should be noted that in some configurations, the hose 204 may be connected to the pressure source 202 via another hose or a rigid tube that allows a user to direct and move the hose 204 within the build piece 209. The internal channel 212 may provide an internal path through the hose 204 providing fluid and pressure continuity between the inlet and the outlet. Thus, a user may attach the inlet to an outlet of the pressure source 202 in order to pressurize the internal channel 212.

Prior to pressurizing the hose 204, a user (e.g., a skilled worker or automated assembly robot) may insert the hose into an opening of the build piece 209 and guide the hose 204 to an internal location of the structural support 231. The user may toggle the pressure source 202 to introduce pressurized fluid to the internal channel 212, which may escape via the aperture(s) 206. This causes the hose 204 to move erratically within the confines of the build piece 209 to demolish the structural support 231 and clean the corresponding internal location of the build piece 209. The hose 204 may be navigated through internal spaces of the build piece while pressurized.

As the hose 204 moves erratically within the build piece 209, the one or more of the first fracturing member 208 and the second fracturing member 210 may collide with the structural support 231 and break it apart. Pressurized fluid may be discharged at a high velocity from the aperture(s) 206 pushing debris (e.g., residual power material from the additive manufacturing process) and broken pieces of the structural support 231 out of the build piece 209. Thus, the hose 204 may be configured to not only demolish the structural support 231, but also clean an interior region of the build piece 209 regardless of whether a structural support 231 exists in the interior region. As discussed, the structural support 231 may be constructed to be weaker than the surrounding the build piece 209, thereby limiting damage to internal locations of the build piece 209 while demolishing the structural support 231.

The pressurized fluid may include a combination of gas, liquid, and/or particulate matter may be used to demolish a structural support. For example, a liquid chemical or solvent may first be dispensed via the hose 204 within the internal location of the build piece 209 to weaken/etch the structural support 231. Then, the liquid may be replaced with compressed air and/or water to demolish the structural support 231 and clear out any debris and remaining chemicals. The pressurized fluid (either liquid or gas) may include a particulate matter to enhance the demolishing and cleaning capabilities of the hose 204.

Example Flexible Hose Configurations

FIGS. 3A-3D are diagrams illustrating different designs and configurations of bendable and elongated tube members for hoses (e.g., hose 204 of FIG. 2) that may be used for demolishing a structural support (e.g., structural support 131 of FIGS. 1A-1D, and structural support 231 of FIG. 2) and/or cleaning an internal region of a build piece (e.g., build piece 109 of FIGS. 1A-1D and build piece 209 of FIG. 2). Each of the hoses illustrated in FIGS. 3A-3D may be used for conveying a pressurized fluid. It should be noted that a hose may be constructed to include a combination of the features and aspects of any of the hoses illustrated in FIGS. 3A-3D. While each of the example tube members illustrated in FIGS. 3A-3D are circular, other shapes are contemplated. For example, a tube member may also include a collapsible tube member that may lay flat when empty and ovoid when filled with a pressurized fluid. In such an example, the shape of the tube member may include edges that may aid in the demolition of a support structure.

Figure 3A:
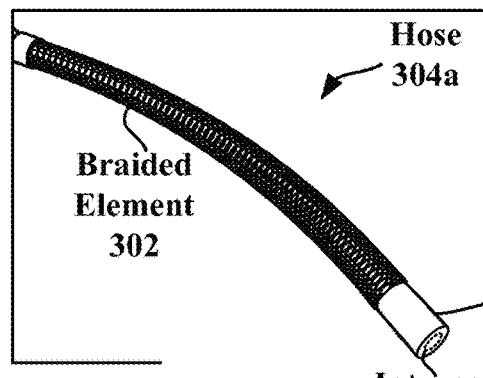
FIGS. 3A-3D are diagrams illustrating different designs and configurations of tubular members of a hose that may be used for demolishing a structural support and/or cleaning an internal region of a build piece.

FIG. 3A illustrates a hose 304a defined by a rubber hose 306 and a braided element 302. In this embodiment, the rubber hose 304a may be a unitary, single-layer construction that includes an internal channel 308 through which a pressurized fluid may pass. The braided element 302 forms an outer cover for the rubber hose 306 that assists in protecting the rubber hose 306 from damage when it is used to demolish a structural support. The braided element 302 may include a braided reinforcement material. Alternatively, the braided element 302 can include a spirally wound, knitted, or wrapped reinforcement material. The braided element 302 may include a single ply or multiple plies of reinforcement materials and may fully cover the rubber hose 306 (e.g., 100% coverage) or partially cover the rubber hose 306 (e.g., 50% coverage).

The reinforcement material can include, for example, a metal wire made from carbon steel, stainless steel, galvanized steel, zinc plated steel, brass, steel alloys, and blends thereof. Alternatively, the reinforcement material can include natural fibers and textiles, synthetic fibers and textiles, or other reinforcement materials typically found in hose constructions.

Figure 3B:
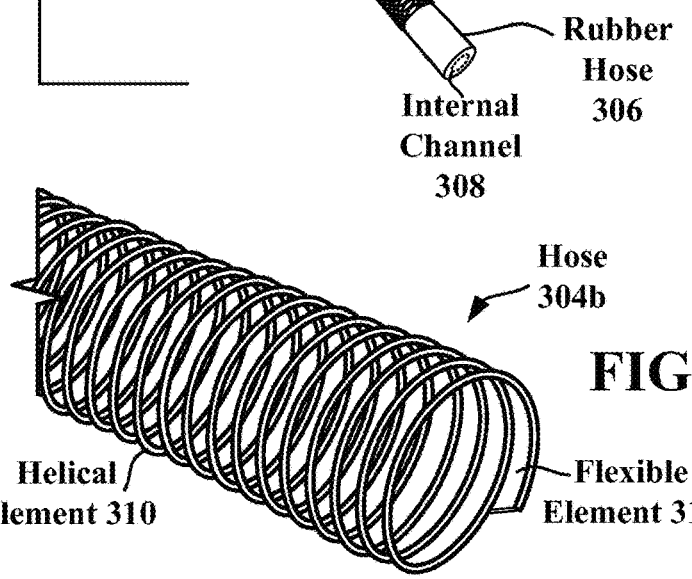

FIG. 3B illustrates a hose 304b defined by a helical element 310 and a flexible element 312 (illustrated as transparent for simplicity). In this embodiment, the helical element 310 may be constructed of metal, plastic, or a plastic coated metal. The helical element 310 may be housed within, or coupled to an outer surface or an inner surface, of the flexible element 312. The flexible element 312 may be constructed of a flexible material such as one or more of nylon, polyurethane, polyethylene, polyvinyl chloride (PVC) (e.g., unplasticized PVC (uPVC)), or synthetic or natural rubbers. The hose typically has a wall surface of one or more layers of a thermoplastic material. The helical element 310, being constructed of a hard material, may help demolish a structural support or clean an internal surface within a build piece. The helical element 310 may also provide structural support for an internal channel of the hose 304b by resisting expansion of the hose 304b in response to a high-pressure fluid.

Figure 3C:
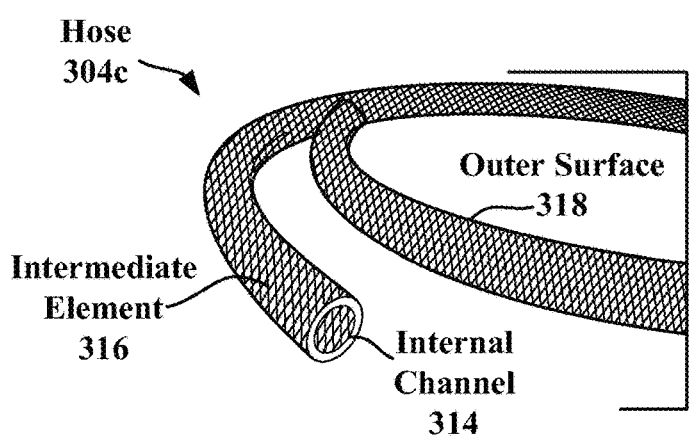

FIG. 3C illustrates a hose 304c defined by an intermediate element 316 provided within multiple layers of flexible material. In this embodiment, the hose 304c may be formed of a composite, multi-layer construction of flexible material that includes an innermost layer or liner, which defines an internal channel 314, and an outermost layer, which defines an outer surface 318. The intermediate element 316 may be positioned between the inner most and outer most layers.

Figure 3D:
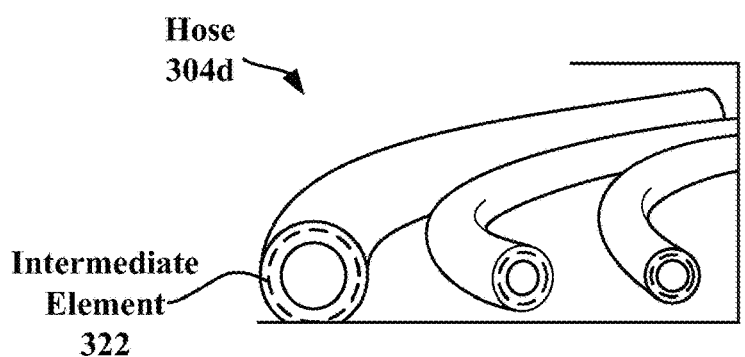

As illustrated, the intermediate element 316 includes a patterned reinforcement material. In some examples, the intermediate element 316 may be a spirally wound, knitted, or wrapped reinforcement material. Similar to the hose 304a of FIG. 3A, the intermediate element 316 may be employed in the hose 304c to resist expansion of the internal channel 314 in response to introduction of a pressurized fluid to the internal channel 314. In some examples, the intermediate element 316 may include a single ply or multiple plies of reinforcement materials positioned between one or more layers of the multi-layer construction. FIG. 3D illustrates a hose 304d having a composition similar to the hose 304c of FIG. 3C. For example, hose 304d is defined by an intermediate element 322 provided within multiple layers of flexible material. In some examples, the intermediate element 322 may include a high-tensile textile cord made of natural fibers and textiles, synthetic fibers and textiles, or other reinforcement materials typically found in hose constructions.

FIGS. 4A-4E are diagrams illustrating different designs and configurations of hoses (e.g., hose 204 of FIG. 2) that may be used for demolishing a structural support (e.g., structural support 131 of FIGS. 1A-1D, and structural support 231 of FIG. 2) and/or cleaning an internal region of a build piece (e.g., build piece 109 of FIGS. 1A-1D, and build piece 209 of FIG. 2). Each of the hoses illustrated in FIGS. 4A-4E may be used for conveying a pressurized fluid.

Figure 4A:
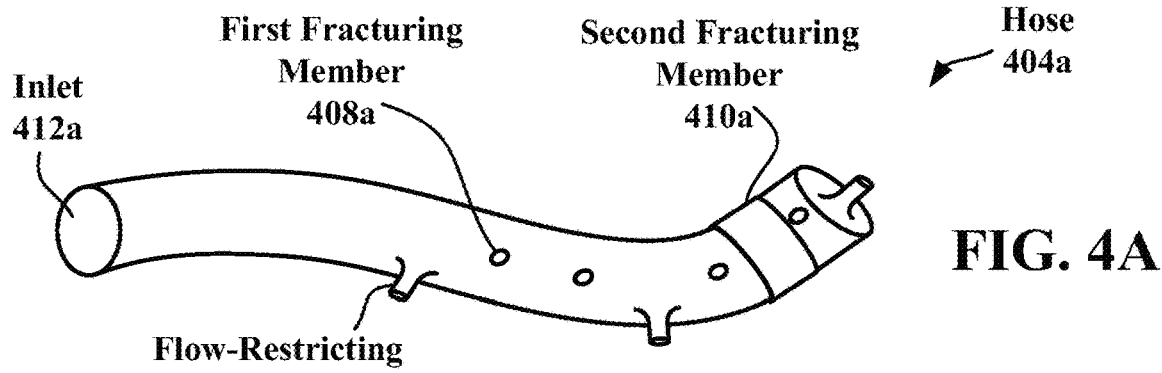
FIGS. 4A-4E are diagrams illustrating different designs and configurations of fracturing members and other aspects of hoses that may be used for demolishing a structural support and/or cleaning an internal region of a build piece.

FIG. 4A illustrates a hose 404a having a single tube member, a plurality of first fracturing members 408a, and a single second fracturing member 410a. An inlet 412a of the hose 404a may be configured to be removably attached to an outlet of a pressure source. The hose 404a may include one or more outlets in the form of one or more flow-restricting apertures 406a.

Figure 4B:
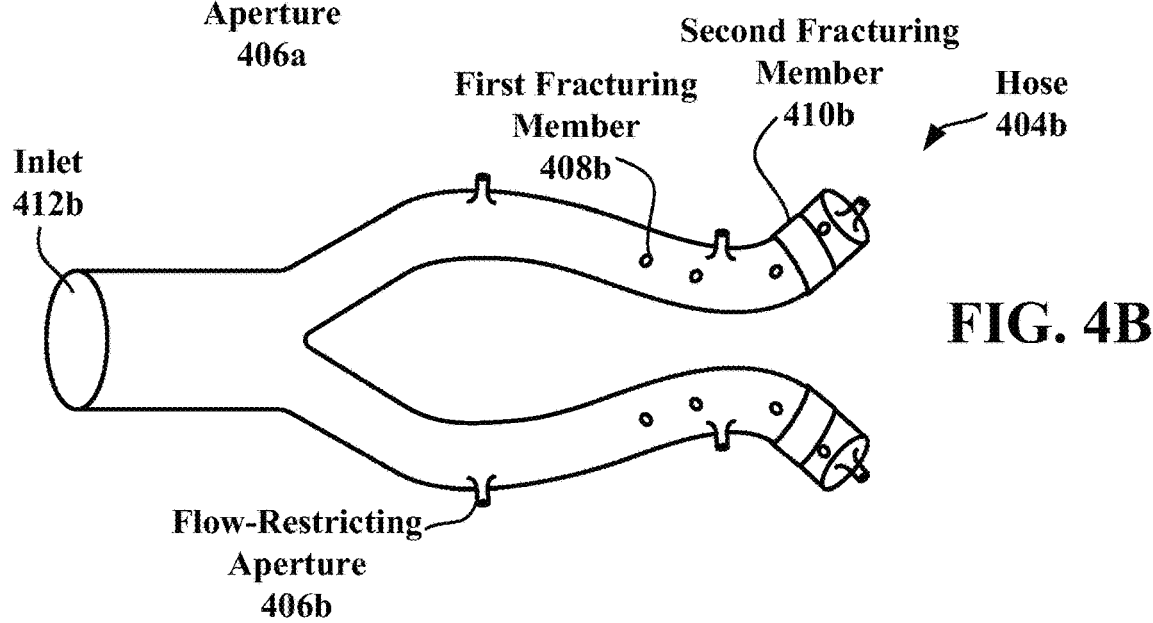

FIG. 4B illustrates a hose 404b having two tube members commonly attached to an inlet 412b. In some examples, the hose 404b may include two or more tube members that are commonly attached to a common inlet. Each of the two tube members may include a plurality of first fracturing members 408b and a single second fracturing member 410b. An inlet 412b of the hose 404b may be configured to be removably attached to an outlet of a pressure source and may be sized to provide suitable fluid pressure to each of the tube members. One or more flow-restricting apertures 406b may provide a fluid outlet on each of the tube members.

Figure 4C:
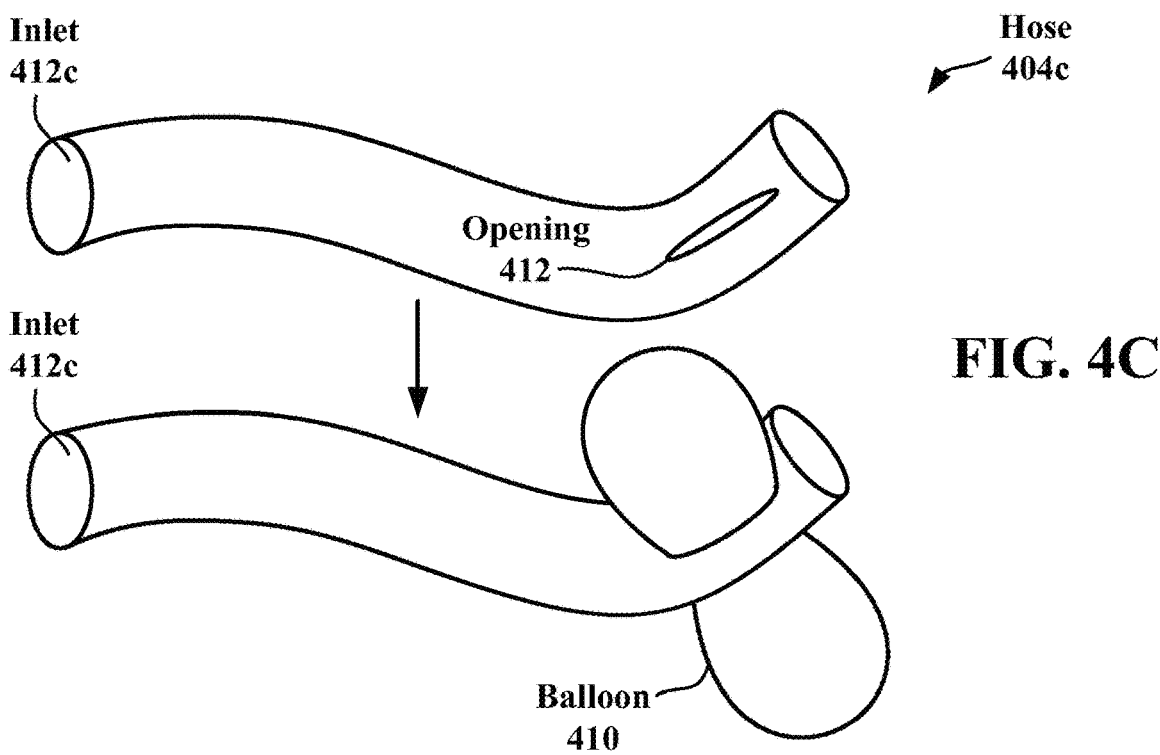

FIG. 4C illustrates a hose 404c having one or more inflatable balloons 410 configured to radially expand outward from a longitudinal axis of the hose 404c from a first opening 412 in the side of the hose 404c and from a second opening in the opposite side. The balloon 410 is configured to inflate via a pressurized fluid received at an inlet 412c of the hose 404c. As illustrated, the balloon 410 has a generally spherical shape; however, other shapes are also contemplated. For example, the shape of the balloon 410 may include a generally "accordion" shape in that it may include a series of fluidly connected cells that expand outward in response to receiving pressurized fluid. In some examples, the balloon 410 may extend from only one opening or from multiple openings in the side and along the length of the hose 404c. The hose 404c may be a flexible tube constructed of any of the materials described above or may be a rigid tube constructed of a plastic or metal material.

Figure 4D:
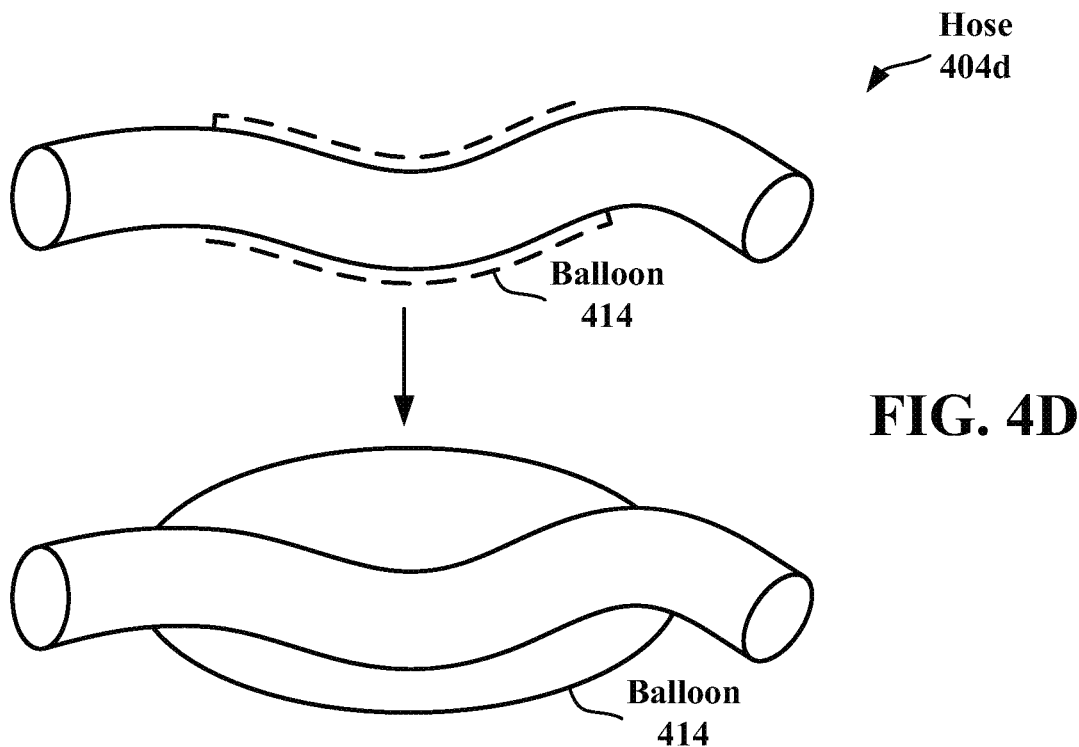
Figure 4E:
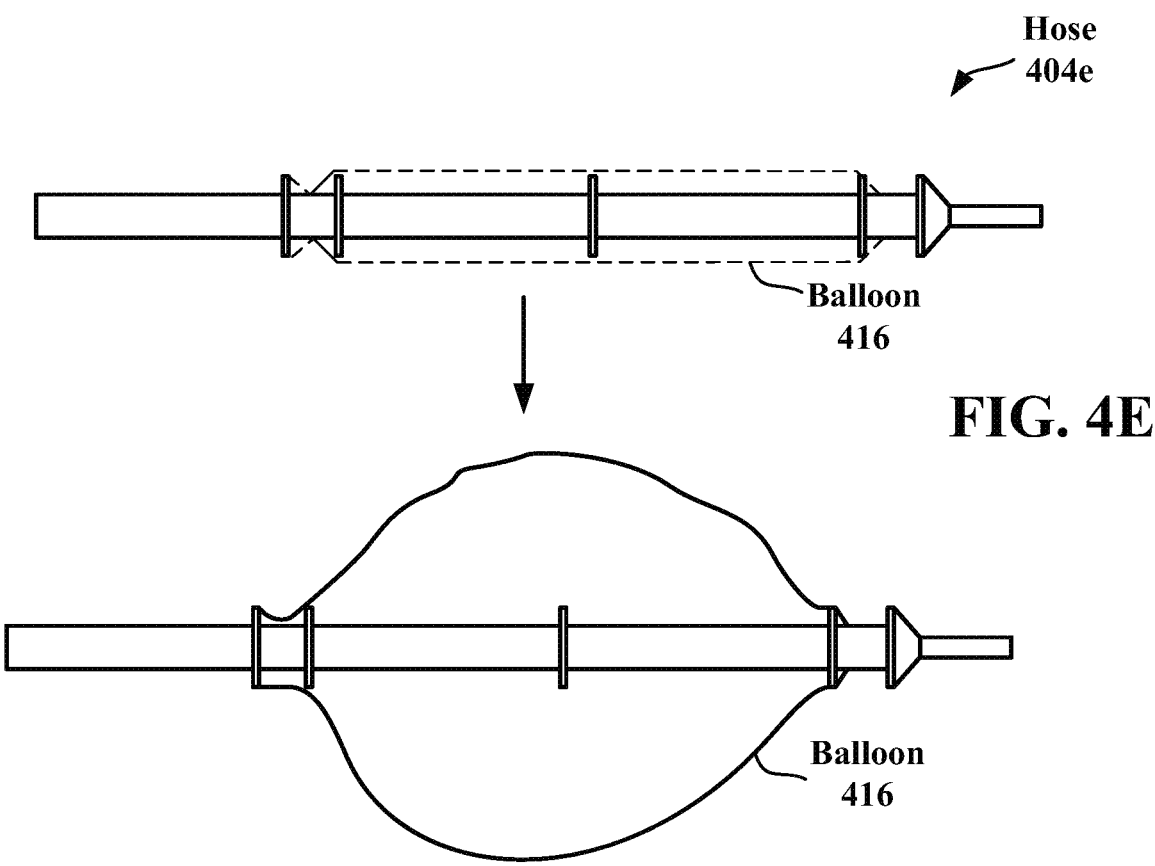

FIGS. 4D and 4E illustrates hose 404d/404e having an inflatable balloon 414/416 that is fitted on an outer surface of the hose 404d/404e. In the example illustrated in FIG. 4D, the balloon 414 is fitted on an outer surface of a flexible hose 404d, whereas the balloon 416 of FIG. 4E is fitted on a hose 404e that is rigid. In either example, the balloon 414/416 may be bonded or fused to the outer surface of the hose 404d/404e by a pipe clamp, suitable adhesive, ultrasonic welding, or other bonding technique known by those of skill in the art. One or more outlets along the length of the hose 404d/404e may provide fluid continuity between an internal channel of the hose and the balloon 414/416, allowing a pressurized fluid that enters the hose 404d/404e to inflate the balloon 414/416.

In certain aspects, the balloons of FIGS. 4C-4E may be used to demolish a structural support within a build piece by inserting the hose into the build piece and aligning an opening of the hose with the structural support. A pressurized fluid may then cause the balloon to exert pressure on the structural support by inflating the balloon until the exerted pressure breaks the structure. In some examples, the hose may include multiple tube members, wherein each of the multiple tube members include at least one balloon.

In one example, after the balloons of FIGS. 4C-4E have broken the structure, the balloons may be deflated to allow removal of the hose, and another hose (e.g., the hoses illustrated in FIGS. 4A and 4B) may be inserted into the structure to clean out and/or further break down any remaining pieces of the structural support.

The balloons of FIGS. 4C-4E may be designed based on the based on a particular build piece and/or structural support within the build piece. For instance, the inflated size and the length of the balloon may be determined based on the amount of pressure estimated to break the structural support. In some examples, the balloon may be designed with one or more fracturing members (described below) attached to an outer surface of the balloon to aid in demolishing the structural support. The balloon may be constructed of any suitable material, such as an appropriate polymeric material. Particular examples include the polyamide family, or the polyamide blend family, polyethylene (PE), polyethylene terephthalate (PET), polyurethanes, polyamides, and polyamide blends such as PEBAX®. In addition, the balloons, as well as any other aspects described herein, can be constructed of a composite material, such as a combination of elastomeric and semi to non-compliant materials such as: urethane; silicone; nylon; latex; (elastomeric) polyethylene hytrel pebax polyaryletherthketone; polyoxymethylene; polyamide; polyester thermoplastic polyetheretherkatone; and polypropylene (semi non-compliant). The balloon may be also be constructed by combining the above-disclosed materials with mesh/woven textile materials such as Kevlar, silk, cotton, wool, or a metal mesh, etc.

Figure 5A:
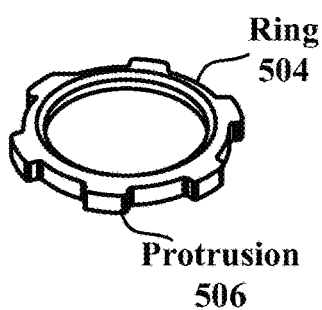
FIGS. 5A-5H are diagrams illustrating example fracturing members that may be attached to an outer surface of one or more of a hose or a balloon coupled to the hose.
Figure 5A:
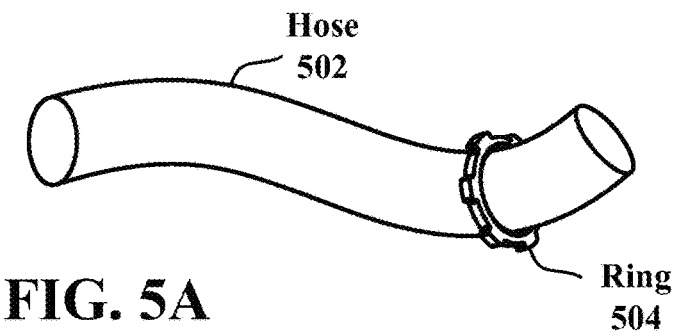

FIGS. 5A-5H are diagrams illustrating example fracturing members that may be attached to an outer surface of one or more of a hose or a balloon coupled to the hose. For example, FIG. 5A illustrates a ring 504 configured to be attached to the outer surface of a hose 502. As illustrated, the ring 504 includes a plurality of protrusions 506 extending outward from an outer surface of the ring 504 having sharp edges to aid in the demolition of a structural support within a build piece. Although the protrusions 506 are illustrated as squared, any suitable shape may be used (e.g., spikes, grooves, etc.). In another example, the ring 504 may have a single protrusion that extends outwardly like a blade. The ring 504 may be attached to the hose 502 via threading on an inner surface of the ring 504, an adhesive, and/or any suitable means of mechanical attachment.

Figure 5B:
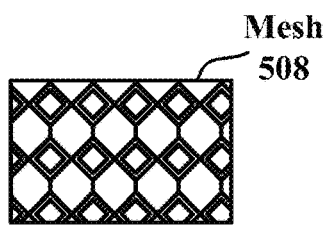
Figure 5B:
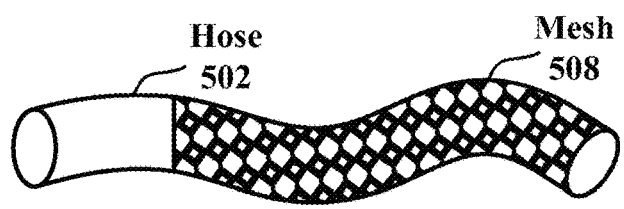

FIG. 5B illustrates a mesh 508 configured to be fitted to the outer surface of a hose 502. The mesh 508 may be formed by metal/plastic wire netting configured to form a pattern. In another example, the mesh 508 may be formed using perforated sheet metal (e.g., by perforating or slitting the sheet and stretching it to reveal a pattern of metal edges). The mesh 508 may be attached to one or more regions of the hose 502 via any suitable means of mechanical attachment including screw, rivet, adhesive, and/or a clamping mechanism. In some examples, the mesh 508 may be attached to a portion of a balloon. For example, the mesh 508 may be configured to radially expand conformal to a contour of the outer surface of the balloon when inflated and radially contract when the balloon is deflated.

Figure 5C:
Figure 5C:
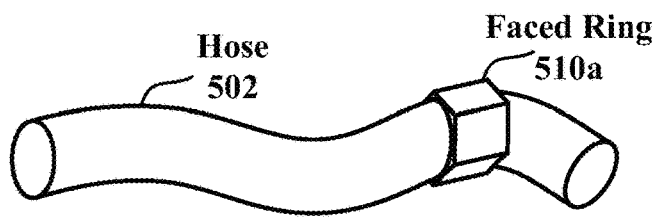
Figure 5D:
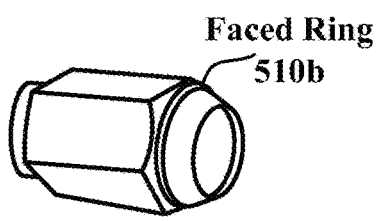
Figure 5D:
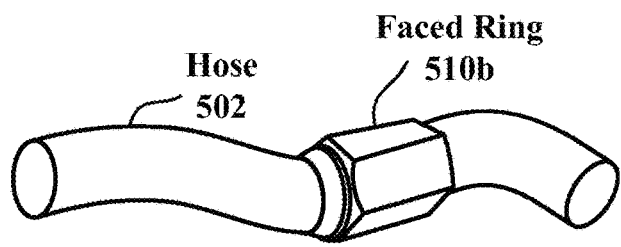
Figure 5E:
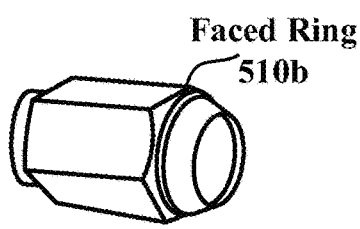
Figure 5E:
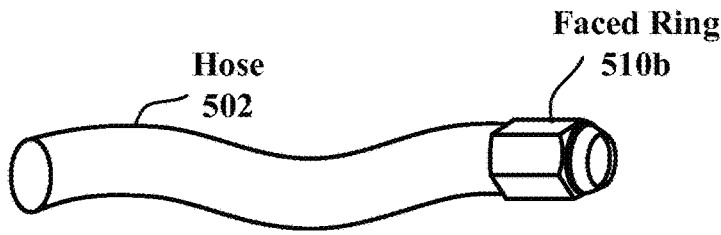

FIG. 5C illustrates a faced ring 510a having an outer surface defined by a hexagonal prism face. In other examples, the faced ring 510a may include any number of faces (e.g., a polygonal prism face), or a smooth face. The faced ring 510a may be attached to the hose 502 via threading on an inner surface of the ring 504, an adhesive, and/or any suitable means of mechanical attachment. FIG. 5D illustrates another example of a faced ring 510b having a relatively longer outer surface. FIG. 5E illustrates another example of the faced ring 510b having an alternative placement at a distal end of the hose 502. In this example, a fluid pressure outlet, such as a flow-restricting aperture, may be located at the distal end of the hose 502 to increase the destructive capability of the faced ring 510b.

Figure 5F:
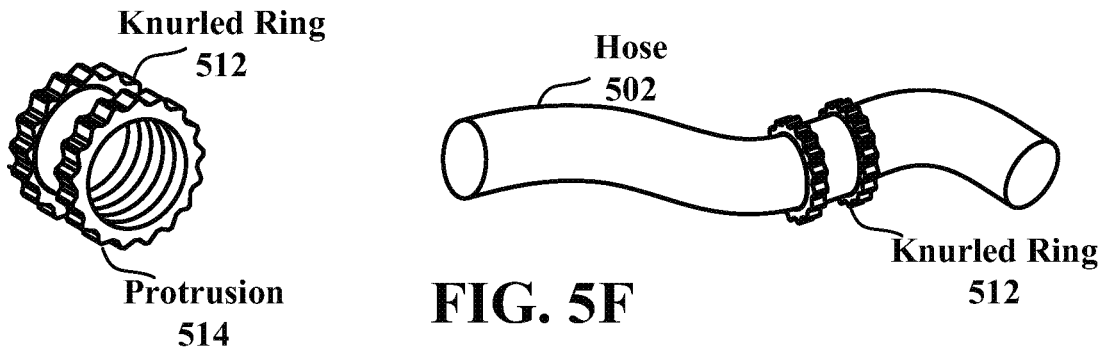

FIG. 5F illustrates a knurled ring 512 having an outer surface defined by multiple rows of protrusions 514 or knurling extending outward from an outer surface of the ring. In other examples, the knurled ring 512 may include any suitable number of rows of protrusions 514. The knurled ring 512 may be attached to the hose 502 via threading on an inner surface of the ring, an adhesive, and/or any suitable means of mechanical attachment. It should be noted that the rings and plates described herein may be defined by an inner surface that runs circumferentially along an outer surface of the tube member. That is, the inner surface of the ring or plate may be coupled and/or adhered to the outer surface of the hose 502.

Figure 5G:
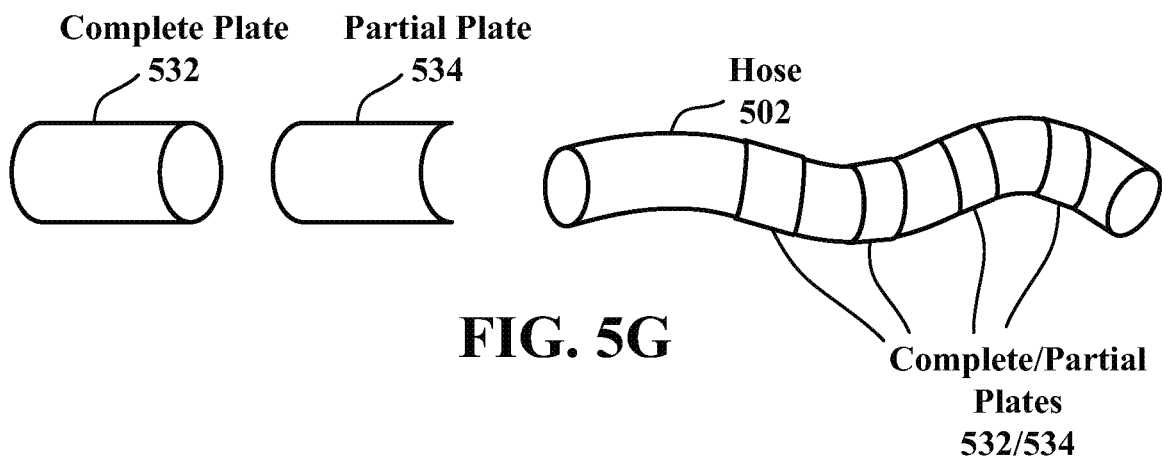

FIG. 5G illustrates an example of a hose 502 having multiple complete plates 532 and/or partial plates attached to an outer surface of the hose 502. The plates may be shaped according to the hose 502 contours in the regions that the plates are attached. Here, the complete plate 532 forms a complete ring around the outer surface of the hose 502, and the partial plate 534 covers only half of the outer surface. In other examples, the partial plate 534 may cover more or less area of the outer surface. The plates may also be configured in other shapes, including triangles, circles, and any other suitable shape. The plates may be arranged on the outer surface of the hose 502 or a balloon in according to a pattern in order to maintain flexibility of the hose 502 and/or balloon. The complete plate 532 and the partial plate 534 may be attached to the outer surface using one or more of an adhesive or other mechanical fastener (e.g., threads, screw, rivet, prong, magnet, etc.).

Figure 5H:
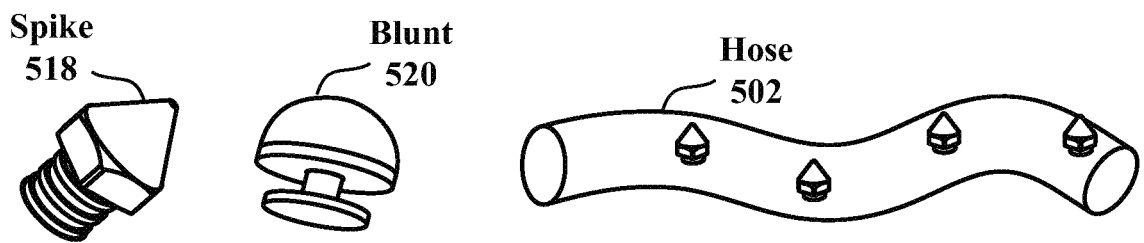

FIG. 5H illustrates an example of localized fracturing elements attached to the hose 502, including a spiked element 518 and a blunt element 520. The localized fracturing elements may be attached to the outer surface of the hose 502 or balloon using one or more of an adhesive or other mechanical fastener (e.g., threads, screw, rivet, prong, magnet, etc.). It should be noted that a hose and/or balloon may be configured with one or more of the fracturing elements described above.

Figure 6:
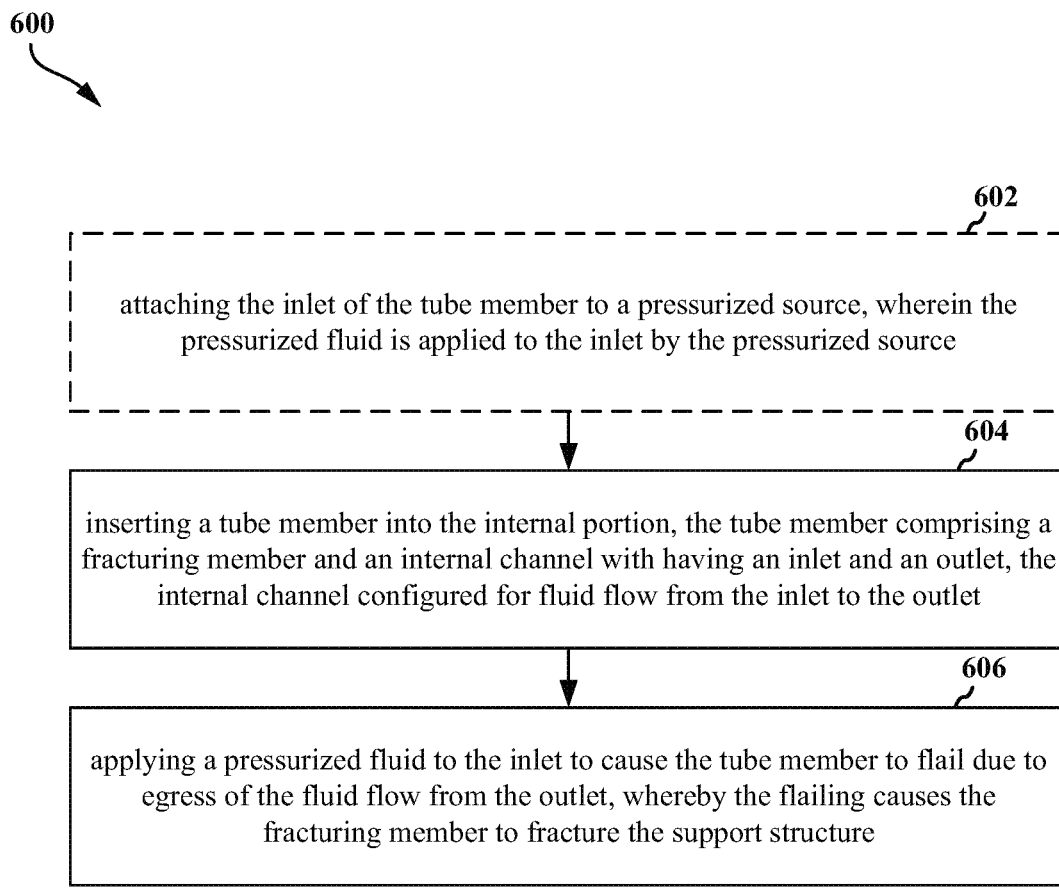
FIG. 6 is a flow diagram illustrating an example method for removing structural support from an internal portion of a manufactured part.

FIG. 6 is a flow diagram 600 illustrating an example method for removing a support structure from an internal portion of a part. For example, the support structure may correspond to structural support 231 of FIG. 2, the internal portion may correspond to the hollow portion 214 of FIG. 2, and the manufactured part may correspond to build piece 209 of FIG. 2. It should be noted that one or more elements of the flow diagram 600 may be performed by the hoses of FIGS. 3A-3D, 4A and 4B, and the fracturing members of FIGS. 5A-5H.

An optional block 602 includes attaching the inlet of the tube member to a pressurized source, wherein the pressurized fluid is applied to the inlet by the pressurized source. For example, an inlet of a hose may be coupled to a pressure source (e.g., pressure source 202 of FIG. 2) such that a pressurized fluid is received by the internal channel of the hose and transmitted via the internal channel to an outlet of the hose. The outlet may be a flow-restricting aperture configured to restrict egress of the fluid flow from the outlet. The flow-restricting aperture may cause the hose to flail. In some examples, the hose may include multiple outlets.

Block 604 includes inserting a tube member into the internal portion, the tube member comprising a fracturing member and an internal channel with having an inlet and an outlet, the internal channel configured for fluid flow from the inlet to the outlet. For example, the tube may be inserted into the internal portion of an additively manufactured part such that the outlet is within the internal portion of the part.

Block 606 includes applying a pressurized fluid to the inlet to cause the tube member to flail due to egress of the fluid flow from the outlet, whereby the flailing causes the fracturing member to fracture the support structure. For example, the pressure source may provide a pressurized fluid to an internal channel of the tube member, and the escape of the pressurized fluid from the outlet may cause the tube member to flail and make contact with the internal structure of the part. The force of such contact may cause the internal structure to break apart.

In certain aspects, the pressurized fluid comprises one or more of a liquid, a gas, or a solid particulate.

Figure 7:
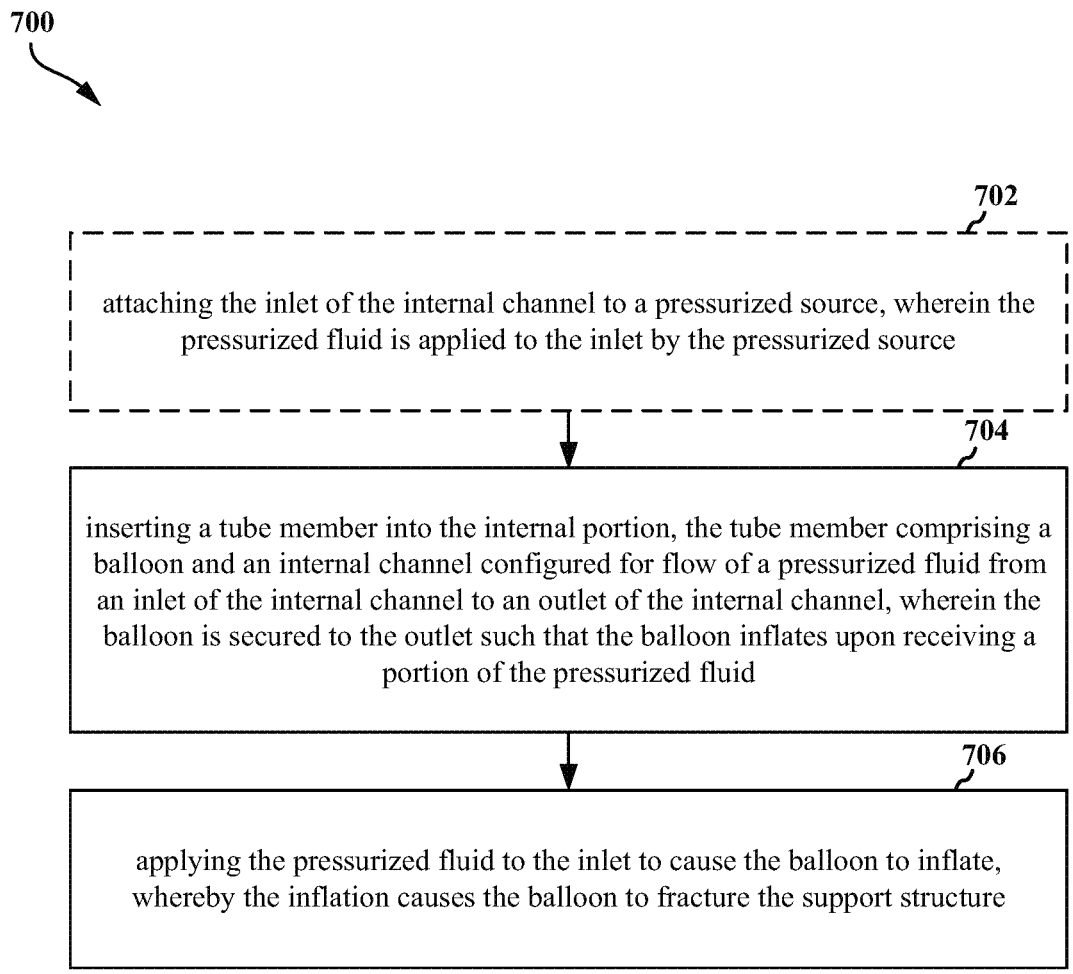
FIG. 7 is a flow diagram illustrating another example method for removing structural support from the internal portion of the manufactured part.

FIG. 7 is a flow diagram 700 illustrating another example method for removing a support structure from an internal portion of a part. For example, the support structure may correspond to structural support 231 of FIG. 2, the internal portion may correspond to the hollow portion 214 of FIG. 2, and the manufactured part may correspond to build piece 209 of FIG. 2. It should be noted that one or more elements of the flow diagram 700 may be performed by the hoses of FIGS. 3A-3D and 4C-4E, and the fracturing members of FIGS. 5A-5H.

An optional block 702 includes attaching the inlet of the internal channel to a pressurized source, wherein the pressurized fluid is applied to the inlet by the pressurized source. For example, an inlet of a hose may be coupled to a pressure source (e.g., pressure source 202 of FIG. 2) such that a pressurized fluid is received by the internal channel of the hose and transmitted via the internal channel to an outlet of the hose. The outlet may be coupled to a balloon such that the pressurized fluid causes the balloon to inflate (e.g., expand) within the internal portion of the part.

Block 704 includes inserting a tube member into the internal portion, the tube member comprising a balloon and an internal channel configured for flow of a pressurized fluid from an inlet of the internal channel to an outlet of the internal channel, wherein the balloon is secured to the outlet such that the balloon inflates upon receiving a portion of the pressurized fluid.

Block 706 includes applying the pressurized fluid to the inlet to cause the balloon to inflate, whereby the inflation causes the balloon to fracture the support structure. For example, expansion of the balloon within the internal portion may cause an outer surface of the balloon to come into contact with one or more portions of the support structure. Such pressure may be used to break apart the support structure within the part. It should be noted that in some examples, the outer surface of the balloon may include one or more fracturing members to aid in the destruction of the support structure. For example, the fracturing member(s) may be constructed of a rigid material such as a metal or polymer.

The above-described examples may aid in the demolition of structural supports from within a build piece and/or cleaning of the inside of a build piece. The previous description is provided to enable any person skilled in the art to practice the various aspects described herein. Various modifications to these example embodiments presented throughout this disclosure will be readily apparent to those skilled in the art, and the concepts disclosed herein may be applied to other techniques for demolition and/or cleaning internal regions of structures manufacturing using additive manufacturing techniques. Thus, the claims are not intended to be limited to the example embodiments presented throughout the disclosure, but are to be accorded the full scope consistent with the language claims. All structural and functional equivalents to the elements of the example embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A hose, comprising:
a bendable and elongated tube member configured to be inserted into a hollow portion of an additively manufactured part, the tube member comprising an internal channel with an inlet and an outlet, the internal channel configured for fluid flow from the inlet to the outlet, wherein the inlet is configured to receive the fluid flow from a pressurized source, and the outlet is configured to cause the tube member to flail upon egress of the fluid flow from the outlet; and
a fracturing member, the fracturing member configured to fracture an internal support structure within the hollow portion of the additively manufactured part when the tube member is caused to flail upon egress of the fluid flow from the outlet.

2. The hose of claim 1, wherein the outlet comprises at least one flow-restricting aperture configured to restrict egress of the fluid flow from the outlet, the at least one flow-restricting aperture located at one or more of a distal end of the tube member or between the distal end and a proximal end of the tube member.

3. The hose of claim 1, wherein the fracturing member is attached to an outer surface of the tube member, and wherein the fracturing member comprises at least a metal material or a hardened polymer material.

4. The hose of claim 1, wherein the fracturing member comprises a ring having an inner surface that runs circumferentially along an outer surface of the tube member and an exterior surface extending outward from the tube member.

5. The hose of claim 4, wherein the exterior surface of the ring includes at least a protrusion extending outwardly from the exterior surface, a polygonal prism face, or a smooth face.

6. The hose of claim 1, wherein the fracturing member comprises at least a protrusion extending outwardly from an outer surface of the tube member, a mesh shaped conformal to a contour of the outer surface, or a plurality of plates shaped conformal to the contour of the outer surface.

7. The hose of claim 1, wherein the fluid flow comprises at least a liquid, a gas, or a solid particulate matter.

8. The hose of claim 1, further comprising a balloon configured to receive a portion of the fluid flow from the pressurized source such that the portion of the fluid flow causes the balloon to inflate.

9. The hose of claim 8, wherein a portion of the tube member is arranged inside the balloon, and the balloon is configured to radially expand outward from the portion of the tube member.

10. The hose of claim 8, wherein the balloon is configured to expand outward from a distal end of the tube member.

11. The hose of claim 8, wherein the fracturing member is attached to an outer surface of the balloon, and wherein the fracturing member comprises at least a metal material or a hardened polymer material.

12. The hose of claim 11, wherein the fracturing member comprises at least a protrusion extending outwardly from the outer surface of the balloon, a mesh configured to radially expand conformal to a contour of the outer surface of the balloon when inflated and radially contract when the balloon is deflated, or a plurality of plates shaped conformal to the contour of the outer surface of the balloon when inflated.

13. The hose of claim 1, further comprising a braided metal mesh covering a length of the tube member.

14. The hose of claim 1, wherein the pressurized source comprises a compressed air source.

15. The hose of claim 1, further comprising an inlet coupler attached to the inlet of the tube member, the inlet coupler configured to removably attach the inlet to the pressurized source so that the pressurized source is in fluid communication with the internal channel.

* * * * *